March 28, 1961 F. I. LOVRET 2,977,468

TUNER FOR RADIO AND TELEVISION RECEIVING SETS

Filed March 7, 1960 2 Sheets-Sheet 1

INVENTOR.
FREDRICK I. LOVRET
BY
Jerry J. Dunlap
ATTORNEY

INVENTOR.
FREDRICK I. LOVRET
BY [signature]
ATTORNEY 2,977,468
Patented Mar. 28, 1961

1

2,977,468

TUNER FOR RADIO AND TELEVISION RECEIVING SETS

Frederick I. Lovret, Norman, Okla., assignor to L & M Space Research and Electronics Corporation, Norman, Okla., a corporation of Oklahoma Filed Mar. 7, 1960, Ser. No. 13,252

7 Claims. (Cl. 250—40)

This invention relates generally to improvements in tuners used in radio and television receiving sets, and more particularly, but not by way of limitation, to a novel selector for controlling the operation of the tuning coil assemblies of a multi-channel tuner.

As it is well known in the art, most present day multi-channel tuners are of the turret type wherein the various tuning coil assemblies are arranged along a shaft and are successively coupled to the tuning circuit upon turning of the shaft through the medium of a selector knob on one end of the shaft. Most of these prior tuners have required the use of a multiplicity of spring-loaded contacts riding on a drum carried by the turret shaft for making and breaking the contacts of the tuner coil assemblies by mechanical action upon turning of the turret shaft. With this arrangement, rotation or turning of the selector knob is jerky and usually provides an annoying noise as the various tuner coil assembly contacts are made and broken. Also, with this type of system the various contacts are not sealed inside of the radio or television receiving set housing, such that dust and lint frequently accumulate on the contacts and interfere with their operation. Furthermore, this type of assembly requires a substantial amount of space and is ordinarily difficult to repair.

The present invention contemplates a novel selector for a multi-channel tuner having a plurality of tuning coil assemblies which are tuned to the various stations or channels to be received by the receiving set in which the tuner is utilized. The movable contacts of the tuner coil assemblies are selectively operated by the use of a control magnet attached to each set of movable contacts and an actuating magnet which may be selectively moved adjacent the various control magnets for selectively actuating the various tuner coil assemblies. In a preferred embodiment, the various tuner coil assemblies and control magnets are arranged in circumferentially spaced relation with each control magnet being aligned with the respective tuner coil assembly, such that the entire tuner may be easily housed in a single housing and the various contacts will be fully protected from dust or other foreign matter. Each tuning coil assembly is actuated by aligning the actuating magnet with the respective control magnet, and the actuating magnet is supported on a shaft journaled concentrically with respect to the control magnets to provide a simple and easily operated system. This invention also contemplates the use of a retarding device for increasing the turning resistance of the selector shaft as the actuating magnet is in operating position with respect to each of the tuning coil assemblies to facilitate manual operation of the selector. This invention further contemplates the arrangement of the control and actuating magnets in repelling or opposing relation, such that the actuating magnet may be moved with the minimum of effort from adjacent one control magnet to the next control magnet, and each tuning coil assembly will be positively actuated when the selector is turned to a position for operating the respective tuner coil assembly.

2

An important object of this invention is to provide a multi-channel tuner for radio and television receiving sets which may be easily operated, without a jerky action of the selector, and will give the maximum precision in the operation of the various tuning coils assemblies of the tuner.

Another object of this invention is to provide a tuner for radio and television receiving sets wherein the various contacts of the tuner will be provided the maximum protection against fouling by dust or other foreign matter.

A further object of this invention is to provide a multi-channel tuner for radio and television receiving sets which will occupy the minimum space in the receiving set, and yet may be easily repaired.

Another object of this invention is to provide a multi-channel tuner for a radio or television receiving set which will require the minimum effort for its operation.

A still further object of this invention is to provide a multi-channel tuner which is simple in construction, may be economically manufactured, and will have a long and trouble-free service life.

Other objects and advantages of the invention will be evident from the following detailed description, when read in conjunction with the accompanying drawings which illustrate my invention.

Figure 1:
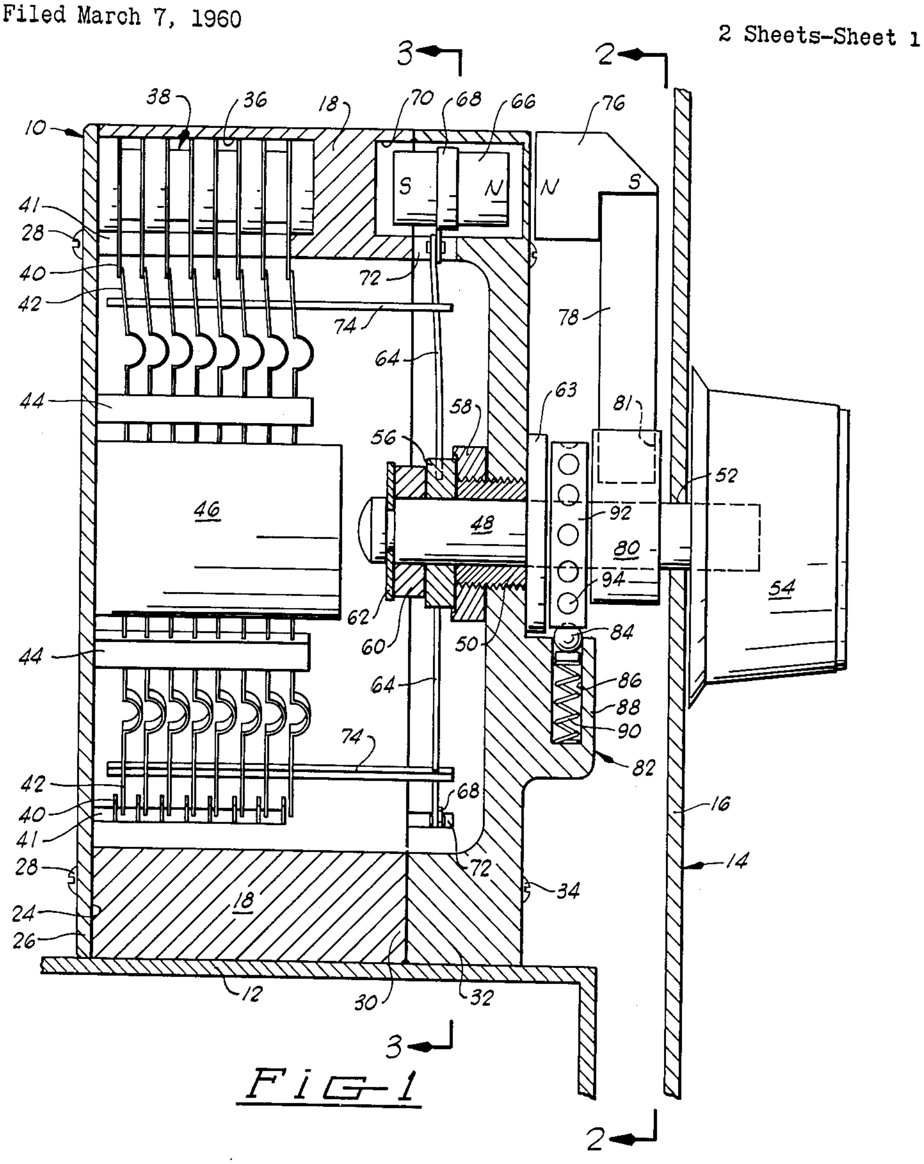
Figure 1 is a longitudinal sectional view through a multi-channel tuner selector constructed in accordance with this invention, with portions of the apparatus shown schematically to more clearly illustrate the invention.
Figure 2:
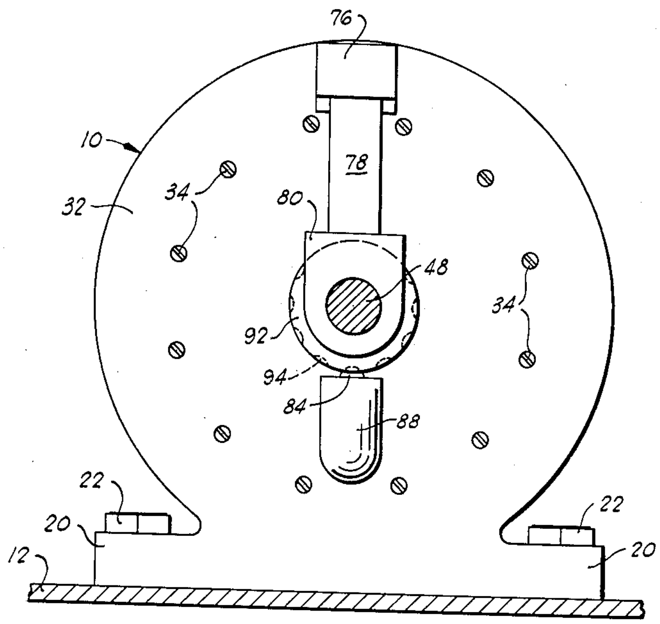
Figure 2 is a vertical sectional view through the forward end portion of the tuner selector, as taken along lines 2—2 of Fig. 1.

Referring to the drawings in detail, and particularly Fig. 1, reference character 10 generally designates a tuner constructed in accordance with this invention and mounted on a suitable bracket 12 within a radio or television receiving set housing 14, only the forward wall 16 of which is shown. The tuner 10 comprises a tubular-shaped housing 18 having outwardly extending flanges 20 (Fig. 2) on the lower end thereof for connection with the bracket 12 by suitable bolts 22. The rear end 24 (Fig. 1) of the housing 18 is closed by a suitable cover 26 secured to the housing by circumferentially spaced screws 28. The forward end 30 of the housing 18 is closed by a dished cover 32 secured to the housing by circumferentially spaced screws 34.

A plurality of circumferentially spaced bores 36 are formed in the walls of the housing 18 from the rear end 24 of the housing to support a plurality of tuning coil assemblies 38. As will be readily understood by those skilled in the art, a tuning coil assembly 38 is provided for each channel of the tuner 10, and each tuning coil assembly 38 is supported in its individual bore 36 to position the tuning coil assemblies in circumferentially spaced relation on the arc of a circle defined by the walls of the housing 18. The stationary contacts 40 of each tuning coil assembly 38 extend radially through a slot 41 inward into the housing 18 to mate with movable contacts 42. Each set of movable contacts 42 is secured in the housing 18 by means of a suitable support bar 44 secured in the housing in any suitable manner, such as by the rear cover 26 of the housing. Each movable set of contacts 42 is connected to any desired type of tuning circuit 46 which may be selectively coupled to the various tuning coil assemblies 38. The details of construction of the tuning circuit 46 form no part of the present invention and are therefore not disclosed herein. It is sufficient to note that the tuning circuit 46 may be easily arranged in the housing 18, when a transistor circuit is used, to provide a compact construction easily accessible by removal of the rear cover 26 of the housing 18.

A selector shaft 48 is journaled in the central portion of the front housing cover 32 by means of a suitable bearing sleeve 50 to support the selector shaft 48 in alignment with the center line of the housing 18. The selector shaft 48 only extends a short distance into the housing 18, but preferably extends forwardly from the housing 18 through a complementary aperture 52 in the forward wall 16 of the receiving set housing 14. A suitable selector knob 54 is secured on the extreme forward end of the selector shaft 48 adjacent the receiving set wall 16 for manual operation of the tuner 10, as will be described. It may be noted here, however, that a suitable dial (not shown) is preferably provided on the receiving set front wall 16 around the selector knob 54 to visually advise the operator of the tuner at least the general position of the tuner 10.

A sleeve 56 is telescoped on the selector shaft 48 within the forward portion of the housing 18 and is held in the desired position between a nut 58 threaded on the bearing sleeve 50 and a washer 60 secured on the extreme inner end of the selector shaft by a suitable snap ring 62. The nut 58 also serves to hold a flange 63 of the bearing sleeve 50 against the cover 32 for supporting the shaft 48 in the desired position. The inner diameter of the sleeve 56 is of a size to provide a sliding fit on the selector shaft 48, such that the sleeve 56 will remain in a fixed position during turning of the selector shaft 48.

Figure 3:
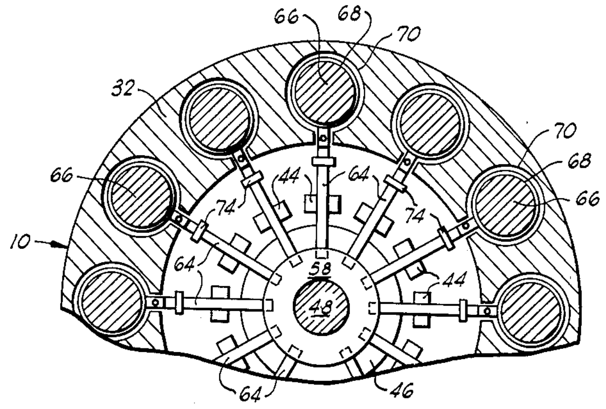
Figure 3 is a partial vertical sectional view through the tuner, as taken along lines 3—3 of Fig. 1.

A plurality of leaf springs 64 are secured in circumferentially spaced relation around the sleeve 56 and extend radially outward from the sleeve 56, as most clearly illustrated in Fig. 3. A control magnet 66 is secured on the outer end of each leaf spring 64 by means of a suitable clamp 68 for selectively operating the tuning coil assemblies 38, as will be described. Each control magnet 66 is positioned in a bore 70 formed partially in the forward end 30 of the housing 18 and partially in the front cover 32 of the housing for forward and rearward movements of the respective control magnet 66 with respect to the housing 18. Each leaf spring 64 extends through a slot 72 formed in the forward end 30 of the housing 18 and in the cover 32 for flexing or bending movement of the respective leaf spring upon forward and rearward movements of the respective control magnet 66. It will also be noted in Fig. 3 that the control magnets 66 are arranged in circumferentially spaced relation on the arc of the circle defined by the walls of the housing 18 and, in a preferred embodiment, each control magnet 66 is in alignment with one of the tuning coil assemblies 38.

Each leaf spring 64 is also connected to one set of the movable contacts 42 by means of a suitable lever 74 extending lengthwise in the housing 18. Each lever 74 may be connected to the respective movable contacts 42 and to the leaf spring 64 in any desired fashion to provide forward and rearward movements of the movable contacts 42 upon forward and rearward movements of the respective leaf spring 64.

An actuating magnet 76 is supported on the selector shaft 48 in front of the housing front cover 32 by means of an arm 78 and bracket 80 for movement of the actuating magnet around the front of the housing 18 upon turning movement of the selector shaft 48. The bracket 80 is secured on the selector shaft 48 in a fixed position in any desired manner and the arm 78 is secured in a complementary slot or bore 81 in the bracket 80 to extend radially with respect to the shaft 48. The actuating magnet 76 controls the operation of the control magnets 66, and hence the tuning coil assemblies 38, as will be described.

A retarding device, generally designated by reference character 82, is carried by the housing 18 and cooperates with the selector shaft 48 to successively increase the turning resistance of the selector shaft 48 during operation of the tuner 10 each time the actuating magnet 76 is in alignment with one of the control magnets 66. The retarding device 82 comprises a suitable ball 84 slidingly supported in a mating bore 86 which is in turn formed in a projection 88 on the front face of the housing front cover 32. The bore 86 is extended radially with respect to the selector shaft 48 and the ball 84 is constantly urged toward the shaft 48 by a small compression spring 90 positioned in the inner end of the bore 86. A collar or sleeve 92 is rigidly secured on the selector shaft 48 in alignment with the ball and is provided with a plurality of indentations 94 in the outer periphery thereof to successively receive a portion of the ball 84 as the selector shaft 48 is turned. Each indentation 94 is so positioned to receive a portion of the ball 84 when the actuating magnet 76 is aligned with one of the control magnets 66. It will be apparent that one of the indentations 94 is provided for each of the control magnets 66 to successively increase the turning resistance of the selector knob 54 as the tuner 10 is being manually operated.

In operation of the tuner 10, the selector knob 54 is turned until the dial on the forward wall 16 of the receiving set indicates that the tuner 10 is tuned to the desired channel. The operator will be advised when the selector knob 54 is in the desired position by an increase in the turning resistance of the knob through cooperation of the ball 84 with one of the indentations 94. In this position of the selector knob 54, the actuating magnet 76 will be aligned with one of the control magnets 66 and will move the respective control magnet 66 forwardly or rearwardly with respect to the housing 18, depending upon the relationship of the actuating magnet 76 to the respective control magnet.

In a preferred embodiment of this invention, like poles of all of the control magnets 66, such as the N-poles of the magnets, are positioned adjacent the front of the housing cover 32, and the corresponding pole of the actuating magnet 76 is extended rearwardly into proximity with the front of the housing front cover 32. Therefore, as the actuating magnet 76 is moved adjacent one of the control magnets 66, the respective control magnet will be repelled rearwardly in the housing 18 to bend the respective leaf spring 64 rearwardly. The bending movement of the respective leaf spring 64 is transmitted through the respective lever 74 to move the respective movable contacts 42 rearwardly into engagement with the respective stationary contacts 40 and couple the respective tuning coil assembly 38 to the tuning coil circuit 46. When the actuating magnet 76 is moved away from one of the control magnets 66, the respective leaf spring 64 will move the respective control magnet forwardly in the housing 18 and open the respective contacts 42 and 40. In considering the action of the control magnets 66 and the actuating magnet 76, it should also be noted that the housing 18 and the front cover 32 of the housing should be formed of a non-magnetic material so as not to interfere with the repelling effect of the actuating magnet 76 on the control magnets. With the relationship of the actuating magnet 76 to the control magnets 66 previously described, movement of the actuating magnet 76 away from one of the control magnets will not be retarded, and the entire turning movement of the selector knob 54 is smooth and easy—it only being affected by cooperation of the ball 84 with the various identations 94 as the actuating magnet 76 is aligned with each of the control magnets 66.

From the foregoing it will be apparent that the present invention provides a novel multi-channel tuner for radio and television receiving sets which will occupy the minimum space and may be easily repaired. The various contacts of the tuner are enclosed in an individual housing in the receiving set housing to prevent the entrance of dirt or other foreign matter between the operating surfaces of the contacts. The present tuner may be easily operated with a minimum of effort, and with a minimum of interruption of turning of the selector knob, yet the tuner may be precisely tuned to the various channels provided thereby. Finally, it will be apparent that the present multi-channel tuner is simple in construction, may be economically manufactured and will have a long and trouble-free service life.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

I claim:

1. In a multi-channel tuner having a tuning coil assembly for each channel, a tubular housing having a front end and a rear end, said housing having a plurality of rearward circumferentially spaced bores in the walls thereof and a corresponding number of forward bores in the walls thereof each aligned with a rearward bore, a tuning coil assembly in each rearward bore, each of said tuning coil assemblies having a set of contacts movable in opposite directions between open and closed positions associated therewith, means supporting the movable contacts of each tuning coil assembly in the housing for closing movement upon rearward movement in the housing and for opening movement upon forward movement in the housing, a control magnet for each of said tuning coil assemblies supported in the forward bores of the housing for forward and rearward movements in the housing, each of said control magnets being connected to the respective movable contacts for opening and closing the respective contacts, spring means urging each control magnet forwardly in the housing, each of said control magnets having an N-pole and an S-pole with like poles thereof positioned adjacent the forward end of the housing, a shaft journaled in the housing extending along the longitudinal axis of the housing, a selector knob on said shaft, and an actuating magnet carried by said shaft for movement around the forward end of the housing adjacent said control magnets, said actuating magnet having an N-pole and an S-pole and being supported on said shaft with the pole thereof corresponding to the forward poles of the control magnets extending rearwardly for successively repelling the control magnets rearwardly in the housing upon turning of said shaft.

2. A tuner as defined in claim 1 characterized further to include a retarding device carried by the housing and cooperating with said shaft for increasing the turning resistance of said shaft when the actuating magnet is in repelling relation with each of said control magnets.

3. A tuner as defined in claim 2 wherein said retarding device comprises a spring-loaded ball carried by the housing and urged in a radial direction toward said shaft, and a collar secured on said shaft in contact with said ball and having an indentation in the outer periphery thereof for each of said control magnets positioned to receive said ball when the actuating magnet is in repelling relation with respective control magnet.

4. A tuner as defined in claim 1 wherein said spring means comprises a sleeve rotatably supported on said shaft and held against rotary movement upon turning of said shaft, and a leaf spring secured to said sleeve extending radially in the housing into connection with each control magnet and biased forwardly in the housing, said movable contacts being supported in the housing in circumferentially spaced relation in alignment with the respective control magnets and being connected to the respective leaf springs for movement of the respective control magnets.

5. A multi-channel tuner having a tuning coil assembly for each channel as defined in claim 1 wherein said tubular housing is comprised of a tubular sleeve with said rear bores and said forward bores in the walls thereof and opening at the rear and front ends thereof respectively, a removable rear plate covering the rear end of the tubular sleeve and a removable front plate covering the front end of the tubular sleeve.

6. In a multi-channel tuner, a tubular housing having a front end and a rear end, a tuning coil assembly for each channel arranged in circumferentially spaced relation adjacent the rear end of said housing, each of said tuning coil assemblies having a set of contacts movable in opposite directions between open and closed positions, forward support means centrally located within the housing adjacent the front end thereof, a leaf spring for each tuning coil assembly rigidly held by said forward support means and extending radially therefrom in alignment with each respective tuning coil assembly, a control magnet supported on each leaf spring at the terminal end thereof, each of said control magnets having an N-pole and an S-pole and said control magnets being arranged with like poles thereof positioned adjacent the front end of the housing and urged to a forward position by the respective leaf spring, means interconnecting each leaf spring with the movable contacts of the respective tuning coil assembly whereby the movable contacts will be open when the respective control magnet is urged to said forward position and will be closed when the control magnet is moved rearwardly, a shaft journaled in the housing extending along the longitudinal axis of the housing, a selector knob on said shaft, and an actuating magnet having an N-pole and an S-pole and being supported on said shaft with the pole thereof corresponding to the forward poles of the control magnets extending rearwardly for successively repelling and moving the control magnets rearwardly in the housing against the bias of the respective leaf spring upon turning of the shaft to thereby successively close the movable contacts of the corresponding tuning coil assemblies.

7. In a multi-channel tuner, a tubular housing having a front end and a rear end, a tuning coil assembly for each channel, each tuning coil assembly being disposed in one of a plurality of circumferentially spaced bores in the walls of the housing adjacent the rear end thereof, a set of stationary contacts associated with each tuning coil assembly, rear support means centrally located within the housing for supporting a set of movable contacts for each tuning coil assembly, said movable contacts extending radially from the rear support means to the respective tuning coil assembly for closing and opening movement with the stationary contacts upon rearward movement in the housing and forward movement in the housing respectively, forward support means centrally located within the housing adjacent the front end thereof, a leaf spring for each tuning coil assembly rigidly held by said forward support means and extending radially therefrom in alignment with each respective tuning coil assembly, a control magnet supported on each leaf spring at the end thereof, each of said control magnets having an N-pole and an S-pole and said control magnets being arranged with like poles thereof positioned adjacent the front end of the housing and urged to a forward position by the supporting leaf spring, means interconnecting each leaf spring with the movable contacts of the respective tuning coil assembly whereby the movable contacts will be open when the respective control magnet is urged to said forward position and will be closed when the control magnet is moved rearwardly, a shaft journaled in the housing extending along the longitudinal axis of the housing, a selector knob on said shaft, and an actuating magnet having an N-pole and an S-pole and being supported on said shaft with the pole thereof corresponding to the forward poles of the control magnets extending rearwardly for successively repelling and moving the control magnets rearwardly in the housing against the bias of the respective leaf spring upon turning of the shaft to thereby successively close the movable contacts of the corresponding tuning coil assemblies.

References Cited in the file of this patent

UNITED STATES PATENTS

| | | |
|---|---|---|
| 1,874,199 | Lingo et al. | Aug. 30, 1932 |
| 2,384,943 | McLoughlin | Sept. 18, 1945 |
| 2,600,581 | Schenendorf | June 17, 1952 |
| 2,795,773 | Perkins et al. | June 11, 1957 |